Figure 1:
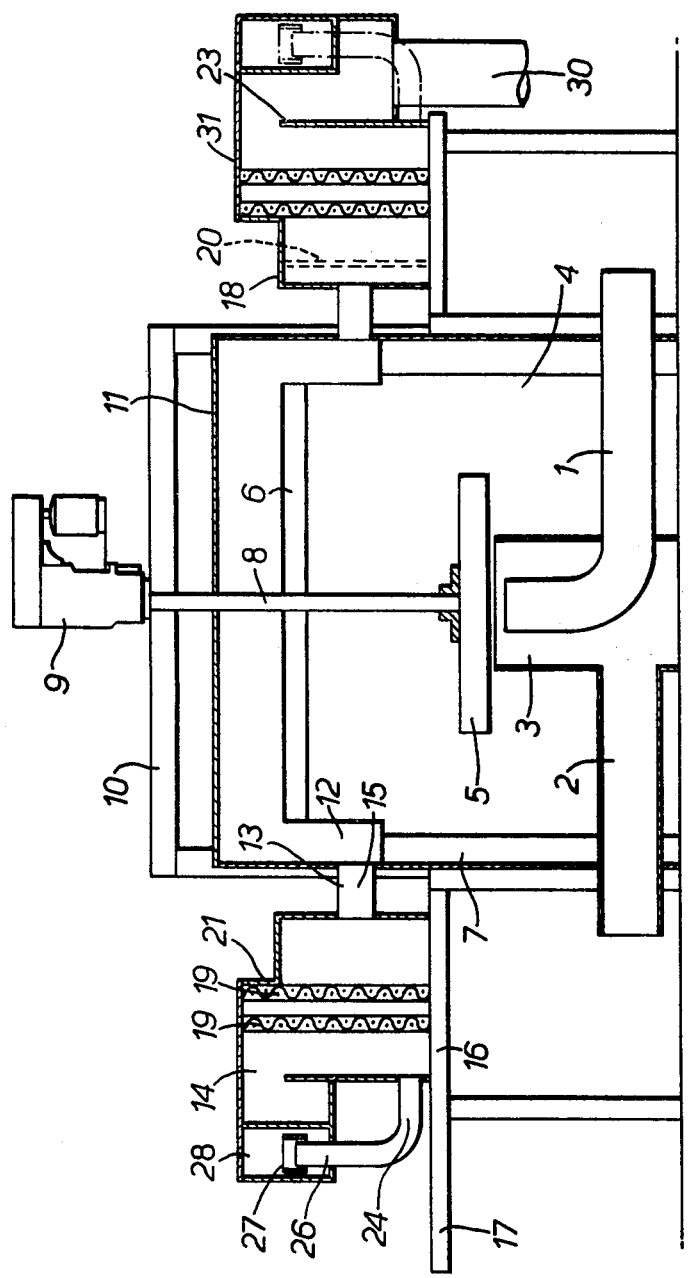

United States Patent [19]

Newrick

[11] 4,218,311
[45] Aug. 19, 1980

[54] SOLVENT EXTRACTOR

[75] Inventor: George M. Newrick, Lindfield, England

[73] Assignee: Davy International (Oil & Chemicals) Limited, London, England

[21] Appl. No.: 565,741

[22] Filed: Mar. 31, 1975

[30] Foreign Application Priority Data

May 2, 1974 [GB] United Kingdom ............... 19266/74

[51] Int. Cl.² ...................... B01D 11/04; B01D 13/00
[52] U.S. Cl. ................................... 210/21; 210/23 R; 210/311; 210/319; 210/345; 210/DIG. 5
[58] Field of Search ................... 210/DIG. 5, 23, 345, 210/319, 311, 520, 21; 423/112

[56] References Cited

U.S. PATENT DOCUMENTS

| 519,275 | 5/1894 | Sellenscheidt et al. ............... 210/345 |
| 1,856,662 | 5/1932 | Showers et al. .................. 210/319 X |
| 3,211,521 | 10/1965 | George et al. .......................... 423/112 |
| 3,228,527 | 1/1966 | McPherson .................... 210/DIG. 5 |
| 3,615,025 | 10/1971 | Rice et al. ........................ 210/311 X |
| 3,830,371 | 8/1974 | Garcia ........................... 210/23 R X |

FOREIGN PATENT DOCUMENTS

| 401484 | 11/1933 | United Kingdom ................... 210/23 R |
| 791025 | 3/1956 | United Kingdom ................... 210/23 R |
| 860880 | 2/1961 | United Kingdom ................... 210/23 R |
| 880537 | 10/1961 | United Kingdom ................... 210/23 R |
| 1027541 | 4/1966 | United Kingdom ................... 210/23 R |
| 1091554 | 11/1967 | United Kingdom ................... 210/23 R |
| 1093188 | 11/1967 | United Kingdom ................... 210/23 R |
| 1117959 | 6/1968 | United Kingdom ................... 210/23 R |
| 1219033 | 1/1971 | United Kingdom ................... 210/23 R |
| 1314124 | 4/1973 | United Kingdom ................... 210/23 R |
| 1333978 | 10/1973 | United Kingdom ................... 210/23 R |

OTHER PUBLICATIONS

Lott, et al., "Design of Large Scale Mixer-Settlers", *Transactions of SME*, vol. 252, (1972).
Roberts, et al., "Horizontal Mixer-Settler Equipment for Liquid-Liquid Extraction", *Trans. Instn. Chem. Engrs.*, vol. 35, pp. 6-20, (1957).

*Primary Examiner*—Frank A. Spear, Jr.
*Attorney, Agent, or Firm*—Bernard & Brown

[57] ABSTRACT

Phase separation in a solvent (liquid-liquid) extraction process is effected in a settling tank by passage through one or more coalescer units. The mixed liquid phases to be separated are introduced at a main supply position from which flow is radially outwardly into the settling tank. A polygonal settling tank is described having removable segments arranged around a mixer tank.

16 Claims, 2 Drawing Figures

SOLVENT EXTRACTOR

The present invention relates to a method and apparatus for solvent extraction (liquid-liquid extraction) which is carried out for example, in metal recovery or in purification processes and utilises an organic solvent or liquid ion exchange material for extraction of a desired material from a contaminated aqueous solution with or without subsequent recovery of the material from the organic phase in a purified aqueous phase.

According to the present invention there is provided a method of effecting phase separation in a solvent extraction process wherein material of mixed liquid phases is caused to flow radially outwardly from a main supply position into a settling tank for passage towards a peripheral part of the tank through one or more coalescer units spaced from the supply position and extending transversely across the whole of said radial flow so as to surround the supply position either wholly or in part. Preferably the main supply position is a mixer tank outlet and is such as to be substantially wholly surrounded by the coalescer unit or units of the settling tank. By this method it is possible to secure a high throughput in a compact apparatus under the optimum conditions of flow for efficient operation of the coalescer unit or units. Preferably the latter are formed as pads of a knitted mesh of materials offering dissimilar properties of wettability to the organic and aqueous components of the mixed liquid phases and serve to promote coalescence of the dispersed phase. For example a knitted mesh of stainless steel wire and polypropylene monofil to provide a large number of junction points between the two materials is known under the trade name of "D. C. Knitmesh".

According to the invention also there is provided a settling tank for phase separation in solvent extraction comprising means to supply material of mixed liquid phases to the tank from a main supply position from which the material thereafter flows radially outwardly towards a peripheral part of the tank, one or more coalescer units in the tank spaced from the supply position and surrounding the latter either wholly or in part so that said radial flow passes through the coalescer unit or units and means at said peripheral part of the tank for the collection or discharge of the separated phases. Preferably the coalescer unit or units is or are disposed so as substantially wholly to surround the main supply position afforded by a mixer tank outlet.

Preferably also such a settling tank is wholly enclosed by a suitable cover thereby reducing evaporation losses. Such a cover also enables the settling tank to be operated under some pressure and may be positioned so as to reduce the constructional dimensions otherwise required for the provision of freeboard above the liquid level in the tank.

Conveniently the settling tank is constructed to be of substantially circular or polygonal form surrounding the main supply position and adapted to be fed by a radial flow of mixed liquids therefrom. Such a tank may be formed from individual segments each carrying one or more coalescer units extending across the segments and preferably removably fitted therein. Each segment may also have valves or gates for flow control of flow shut-off. In the latter case one segment may be removed without shut down of the whole tank. The periphery of the tank or segments may be formed for the collection of the separated phases for which offtake connections are provided. The tank may be of metal and particularly in the case of a segmented structure, may alternatively be formed for example from a glass reinforced plastics material.

The settling tank of substantially circular or multi-sided form may be mounted around a mixer tank to provide a mixer-settler unit and such units can be used in series or in parallel or both, for example for solvent extraction of an acid, neutral or alkali leach liquor followed by an aqueous extraction of the organic solution and, if desired, an aqueous wash of the organic solution before the aqueous extraction therefrom. Such a series of steps would be required for example in recovery of copper from ores or waste which may be of low grade.

Figure 2:
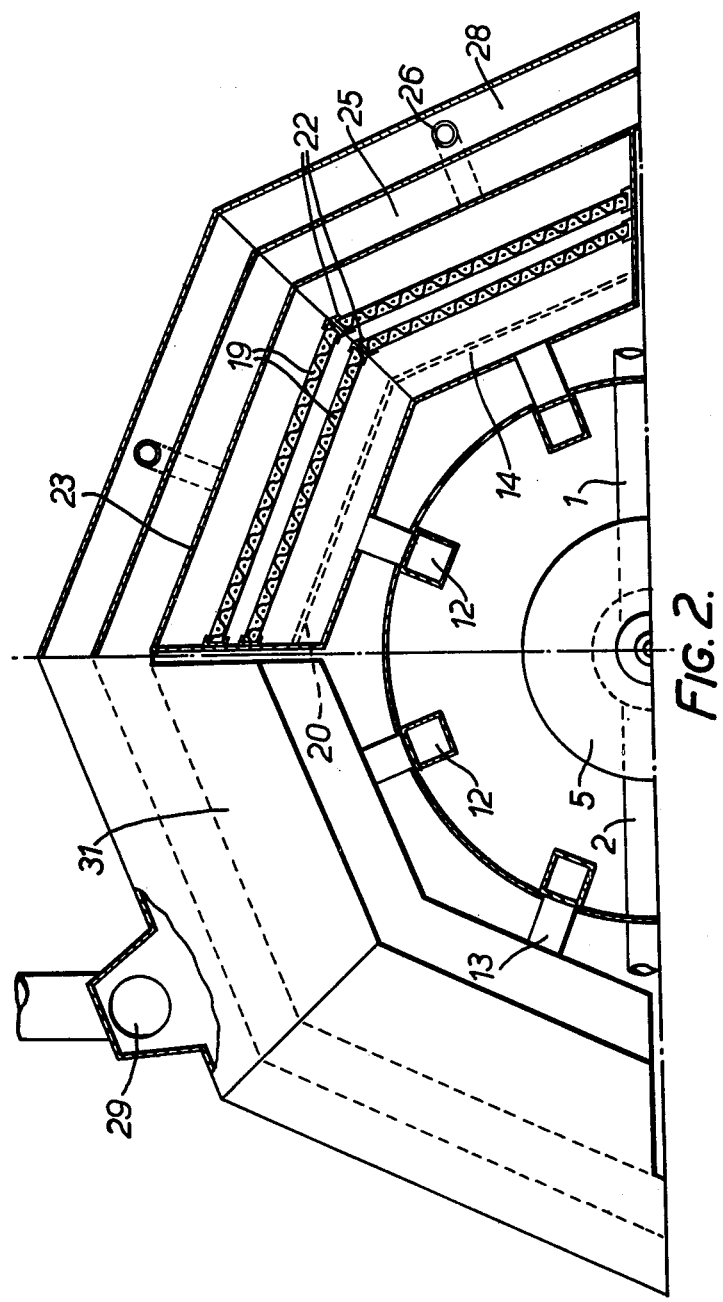

One example of a mixer-settler unit constructed in accordance with the invention will be described by way of example with reference to the accompanying drawings, in which:

FIG. 1 is a central vertical cross section, and
FIG. 2 is a one half plan view with part of the cover removed.

In the drawings, supply lines 1 and 2 for the aqueous and organic liquors pass to a draught tube 3 within the mixer box 4. The draught tube may be two or more concentric tubes of suitable diameter or a single tube with supply branches. The draught tube or tubes may incorporate stiffeners or vanes. An impeller 5 serves to mix the two liquid phases and to provide some hydraulic pressure. The impeller may be off-centre or inclined, but is conveniently located on the vertical axis of the mixer box. Vortexing in the box is broken by means of a baffle 6, and wall baffles 7 may be used to generate shear within the liquors. The impeller is driven by a shaft 8 and a drive mechanism 9, supported on a structure 10. The mixer is covered by a lid 11.

Flow from the mixer to a settler of segmented form is first via a discharge arrangement 12 in the form of an internal launder or a series of individual boxes. These ensure a set residence in the mixer before the liquors pass to the settler. The liquors pass through pipes or ducts 13 to the settler segments 14. Valves (not shown) may be put in the pipes 13 at position 15 to shut off flow as required to any segment.

The segments 14, form the settler. These may be in one complete (e.g. site-fabricated) unit or in several units of a convenient size. The latter may be of a transportable size, and fabricated off-site. The settler may be completely circular or a multi-sided but substantially circular configuration. The segments are supported on a structure 16, which also supports flooring 17 between adjacent mixer settlers. The segments operate with the first part 18 of each segment under pressure, thus ensuring correct flow through the coalescer units or pads 19. Flow in the part 18 may be distributed by a picket fence or baffle 20, located ahead of the coalescer units 19. Risers 21 are formed to contain and house the coalescer pads and this side level of the settler segments is maintained downstream of the coalescer units to contain the hydraulic pressure and the extra volume of fluid during a static condition.

Flow through the segments is radially outward from the main supply from the mixer, and the liquor is coalesced into the two constituent phases as it passes through the coalescer units. The radial flow causes a decrease in velocity of both phases giving a beneficial aid to coalescence. The segments are designed such that the correct velocity is maintained as the liquor passes through the coalescer unit. The latter is contained in a rigid case, not impeding flow, but capable of removal from the segment and making a satisfactory liquid seal with the guide walls 22 of the segment provided to carry and house the coalescer unit.

Coalesced liquors flow radially after passage through the coalescer units 19, to a weir 23 and a take-off pipe 24. One phase flows over the weir into a collection launder 25, which is common to all overflow points. The take-off pipe 24 from below the weir 23 forms a stand pipe 26, with an adjustable sleeve 27, discharging into another launder 28.

The launders 25 and 28 are connected in common to all the settler segments, and may be integrally formed with them, to take account of the differing levels between static and dynamic conditions. Separate launders may be used but would require to contain larger volumes of surge liquor. The adjustable sleeve 27 is used to control the interface level between the coalesced phases after passing through the coalescer units. The take-off and interface adjustment may however be by take-off pipes, constant head pots, interface probes and control valves via pipes or launders.

Take-off pipes 29 and 30 from the launders 28 and 25 respectively take the constituent liquors to the next appropriate unit in the process. Alternatively, a proportion of either phase may be recycled into the mixer.

The launders 25 and 28 and the settler 14 may be constructed from glass reinforced plastic material, either acid or alkali and organic resistant plastics or other materials or from metal. The launders may also be separate from the settler segments and valves 15 or a gate installed such that a segment may be drained and removed without halting the process. By providing coalescer units in each settler segment in sequential pairs, it is also possible for one of the pair of units to be temporarily removed for cleaning without closing down operation of the segment since the second unit remains in operation.

Using a pipe take-off system in place of the launders 25 and 28 would enable the segments to be totally operated under pressure. This would remove any vapour space between the liquor surface and the covers 31. The mixer may also be operated under pressure utilising a suitable shaft seal in a sealed but removable mixer cover 11.

The plant area required by the apparatus described is small and inventory requirements for large plants are much reduced as compared for example with gravity settlers. The surface area of liquor is reduced, hence reducing evaporation losses and reducing the size of the fire hazard area. The settler is arranged in a circular configuration surrounding the mixer such that the flow is radial and aids coalescence. The collection launders described result in a balanced flow and also retain the liquors in the static condition. By incorporating several segments the settler may be adjusted to the correct hydraulic level at all points during construction of the mixer settler. The segments are not only capable of being fabricated off-site, but they are also rendered transportable.

Valves 15 if provided in pipes 13 can be utilised to control flow rates through the apparatus in addition to effecting shut down of any segment special attention to which may be required.

If desired two or more of the mixer settler units can be installed one above the other in a stack.

The apparatus described may be employed in extraction processes for the production, inter alia, of copper, nickel or zinc and volumes of liquid to be treated will be very large so that a flow rate through the apparatus exceeding 500 U.S. gallons per minute will be required, for example of from 1000 to 8000 U.S. Gallons per minute. For efficient operation of coalescer units, an even flow rate of from 40 to 60 cubic meters per square meter per hour is required, possibly up to 80 cubic meters per square meter per hour for very clean liquids, and a very compact and economical plant meeting these requirements is provided by the present invention. For a copper extraction process solids amounting to 10 p.p.m. are expected to be present in the mixed liquids to be treated.

What is claimed is:

1. A mixer-settler unit for solvent extraction comprising: mixer means having inlet means for an aqueous phase and for a substantially water insoluble liquid organic phase, mixing means for effecting contact between the aqueous and organic phases to form a material of mixed liquid phases dispersed one within the other, and outlet means for the material of mixed liquid phases; and settling tank means surrounding the mixer means comprising a plurality of settling tank segments each having a narrow end and a wide end, the narrow ends lying adjacent the mixer means, each segment further comprising inlet means at the narrow end for admitting material of mixed liquid phases from the mixer means, means at the wide end for the continuous discharge of the separated phases, and one or more coalescer units spaced from the narrow end and extending across the path of liquid flow through the segment from the narrow end to the wide end; whereby in use material of mixed liquid phases is formed in the mixer means and passes to the settling tank segments in which radial outward flow occurs through the coalescer units, the separated phases being continuously removed at the wide ends of the segments.

2. A mixer-settler unit as claimed in claim 1, wherein the outlet means from the mixer means comprises a plurality of outlets, each corresponding to a respective settling tank segment, at the upper end of the mixer means.

3. A mixer-settler unit as claimed in claim 1, wherein the mixer means comprises an impeller the drive mechanism for which is carried above the mixer means.

4. A mixer-settler unit as claimed in claim 1, wherein each coalescer unit comprises a knitted mesh of materials offering dissimilar properties of wettability to the organic and aqueous phases of the material of mixed liquid phases.

5. A mixer-settler unit as claimed in claim 1, wherein coalescer units are carried in risers formed in the tank segments of dimensions to contain the hydraulic pressure head of operation.

6. A mixer-settler unit as claimed in claim 1, wherein each tank segment is formed at its wide end with a weir and an offtake pipe for continuous removal of each of the separated phases.

7. A mixer-settler unit as claimed in claim 6, having common launders for offtake from individual tank segments and an offtake pipe from each segment feeding one launder and having an adjustable sleeve at its upper end to control the interface level in the related tank segment.

8. A mixer-settler unit as claimed in claim 1, wherein each segment is provided wih cover means to enclose the segment and permit operation under a small hydraulic pressure.

9. A mixer-settler unit as claimed in claim 1, wherein the coalescer units are removably fitted in the individual segments in sequential pairs.

10. A mixer-settler unit as claimed in claim 1, wherein the individual segments are each provided with flow control means for the control of liquid passing to the segment.

11. A mixer-settler unit according to claim 1, wherein the wider end of each segment is arcuate in shape whereby the settling tank segments together form an annular settling tank of substantially circular form surrounding the mixer means.

12. A mixer-settler unit according to claim 1, wherein the wider end of each segment is a straight side whereby the settling tank segments together form an annular settling tank of polygonal form surrounding the mixer means.

13. In a solvent extraction process in which an aqueous phase is contracted and mixed in a mixing zone with a substantially water-insoluble organic phase to form a material of mixed liquid phases dispersed one within the other, and the material of mixed liquid phases is thereafter passed to a settling zone for separation of the phases and for continuous removal of the separated phases, the improvement comprising supplying the aqueous and organic phases to the mixing zone, mixing the aqueous and organic phases in said mixing zone, causing resulting material of mixed liquid phases to flow radially outward from the mixing zone into a plurality of separate settling zones positioned adjacently around said mixing zone, each of said plurality of settling zones having an inlet end adjacent to and in flow communication with the mixing zone, the flow of resulting material of mixed liquid phases into each of said plurality of settling zone being capable of control or shut-off, and causing said material of mixed liquid phases to flow from said mixing zone into a plurality of said settling zones in which flow communication with said mixing zone is not shut-off, the flow in said settling zones being radially outward with respect to said mixing zone and towards a part of said settling zones remote from the inlet end, through one or more coalescer units positioned to receive liquid from its inlet end and extending transversely across the liquid flow through the said settling zone, whereby material of said mixed liquid phases is caused to flow through the coalescer units of said settling zones which are in flow communication with said mixing zone to coalesce droplets of the dispersed phase, and continuously removing on the downstream side of the coalescer units the separated phases from the settling zones which are in flow communication with said mixing zone.

14. The improved method as claimed in claim 13, wherein the or each coalescer unit comprises a pad of a knitted mesh of materials offering dissimilar properties of wettability to the organic and aqueous phases of the material of mixed liquid phases.

15. The improved method as claimed in claim 14, wherein the material of mixed liquid phases is caused to flow through the coalescer unit at a flow rate of from 40 to 60 cubic meters per square meter per hour.

16. A mixer-settler unit for solvent extraction comprising mixer means and a plurality of settling tanks disposed adjacently around the periphery of the mixer means; the mixer means having inlet means for an aqueous phase and for a substantially water-insoluble liquid organic phase, mixing means for effecting intimate contact and dispersion of the said phases to form a material of mixed liquid phases dispersed one within the other, and outlet means for communication with each of said plurality of settling tanks for discharging from said mixer means material of mixed liquid phases; flow control means for controlling or shutting-off flow of said material of mixed liquid phases between said mixer means and the individual ones of said plurality of settling tanks; and each of said plurality of settling tanks having inlet means at the end adjacent the mixer means for admitting material of mixed liquid phases from the mixer means, means at the other end thereof for the continuous removal of separated phases, and coalescer means extending transversely across the path of flow of liquid in the said settling tank intermediate the ends thereof, which path of flow is from the one end to the other and radially outward from said mixer means; whereby, in use, material of mixed liquid phases is formed in the mixer means and passes to the settling tanks which are in liquid flow communication with said mixer means and in which there occurs flow from the one end to the other through the coalescer means and coalescence of droplets of the dispersed phase.

* * * * *